US009759056B2

(12) United States Patent
Smit et al.

(10) Patent No.: US 9,759,056 B2
(45) Date of Patent: Sep. 12, 2017

(54) PUMP APPARATUS

(71) Applicant: WEIR MINERALS AUSTRALIA LTD, New South Wales (AU)

(72) Inventors: Peter Smit, Cooroibah (AU); Robert Turner, Marcoola (AU); Reman Murandi, Coolum Beach (AU); Kevin Brighton, Moffat Beach (AU)

( * ) Notice: Subject to any disclaimer, the term of this patent is extended or adjusted under 35 U.S.C. 154(b) by 270 days.

(21) Appl. No.: 14/363,294

(22) PCT Filed: Dec. 6, 2012

(86) PCT No.: PCT/AU2012/001490
§ 371 (c)(1),
(2) Date: Jun. 5, 2014

(87) PCT Pub. No.: WO2013/082662
PCT Pub. Date: Jun. 13, 2013

(65) Prior Publication Data
US 2014/0332095 A1 Nov. 13, 2014

(30) Foreign Application Priority Data

Dec. 8, 2011 (AU) ............................ 2011905107
Sep. 12, 2012 (AU) ............................ 2012903987

(51) Int. Cl.
*E21B 19/22* (2006.01)
*E21B 43/29* (2006.01)
(Continued)

(52) U.S. Cl.
CPC ............. *E21B 43/29* (2013.01); *B60P 3/035* (2013.01); *B65H 75/425* (2013.01);
(Continued)

(58) Field of Classification Search
CPC ......... E21B 19/22; E21B 43/29; F04D 29/708
(Continued)

(56) References Cited

U.S. PATENT DOCUMENTS 3,964,508 A * 6/1976 Miller .................... F16P 1/00
137/377
4,037,335 A * 7/1977 Sandberg ............... C21B 7/163
137/4
(Continued)

FOREIGN PATENT DOCUMENTS

AU 2010 203 047 A1 4/2011
AU 2012359293 B2 7/2013
(Continued)

OTHER PUBLICATIONS

Office Action dated Jul. 2, 2015 of copending CN Application No. 2012800693432.
(Continued)

*Primary Examiner* — Kevin Murphy
(74) *Attorney, Agent, or Firm* — Gardere Wynne Sewell LLP

(57) ABSTRACT

Pump apparatus comprising a base or chassis, a power unit and a reel assembly each operatively mounted to the base or chassis, a flexible conveyor conduit and flexible service line adapted to be payed out from the reel assembly and a work head including a pump operatively connected to the conveyor conduit. The work head comprises a pump having an outlet which is operatively connected to a conveying conduit, a support frame to which the pump is mounted and a powered traction drive assembly operatively mounted to the support frame. The reel assembly comprises a reel rotatably mounted to the base or chassis, a conveying conduit and a flexible service line, each being adapted to be wound thereon and payed out therefrom.

13 Claims, 14 Drawing Sheets

(51) Int. Cl.
  F04D 29/70 (2006.01)
  E21F 16/00 (2006.01)
  E21C 35/00 (2006.01)
  B65H 75/42 (2006.01)
  B65H 75/44 (2006.01)
  F04D 1/04 (2006.01)
  F04D 7/04 (2006.01)
  B60P 3/035 (2006.01)
  F04B 17/06 (2006.01)
  F16L 11/22 (2006.01)

(52) U.S. Cl.
  CPC ......... *B65H 75/4402* (2013.01); *E21B 19/22* (2013.01); *E21C 35/00* (2013.01); *E21F 16/00* (2013.01); *F04B 17/06* (2013.01); *F04D 1/04* (2013.01); *F04D 7/04* (2013.01); *F04D 29/708* (2013.01); *F16L 11/22* (2013.01); *B65H 2701/33* (2013.01); *Y10T 137/6899* (2015.04); *Y10T 137/6921* (2015.04)

(58) Field of Classification Search
  USPC ................ 104/138.2; 137/355.12; 138/115
  See application file for complete search history.

(56) References Cited

U.S. PATENT DOCUMENTS

| | | | |
|---|---|---|---|
| 4,050,858 A | 9/1977 | Ewbank et al. | |
| 4,177,734 A | 12/1979 | Rhoden | |
| 4,476,923 A | 10/1984 | Walling | |
| 4,992,030 A * | 2/1991 | Hasslen, III | F04D 9/006 417/360 |
| 5,139,751 A * | 8/1992 | Mansfield | B05B 13/06 118/306 |
| 5,240,383 A | 8/1993 | Ames | |
| 5,303,961 A * | 4/1994 | Popil | E03B 9/06 137/294 |
| 5,535,775 A | 7/1996 | Blaine | |
| 5,848,641 A * | 12/1998 | Epp | E21B 43/128 166/77.2 |
| 6,179,558 B1 * | 1/2001 | Eastman, III | B01D 46/00 415/121.2 |
| 6,209,593 B1 * | 4/2001 | Nichols, Sr. | B64D 1/16 141/2 |
| 7,597,048 B2 * | 10/2009 | Nicholson | B08B 9/035 104/138.2 |
| 7,686,073 B1 * | 3/2010 | Reynolds | E21B 17/003 166/242.1 |
| 2005/0011570 A1 * | 1/2005 | Hayton | F16L 11/22 138/110 |
| 2008/0245258 A1 * | 10/2008 | Herron | F16L 55/32 104/138.2 |
| 2009/0071665 A1 | 3/2009 | Shoap | |

FOREIGN PATENT DOCUMENTS

| | | |
|---|---|---|
| AU | 2012 203 301 A1 | 12/2013 |
| CN | 2154871 Y | 2/1994 |
| GB | 2364014 A | 1/2002 |
| JP | 2005-067796 A | 3/2005 |
| WO | WO-2004/067852 A1 | 8/2004 |
| WO | WO-2013082662 A1 | 6/2013 |

OTHER PUBLICATIONS

Google translation of CN2154871Y dated Feb. 2, 1994.
Espacenet machine translation of Abstract of JP2005-067796A.
LEGRA Engineering Pty Ltd, Products, Highwall Pumps, WayBack Machine, dated Jun. 17, 2011, 2 pg.
LEGRA Engineering Pty Ltd, Products, Highwall Gallery, WayBack Machine, dated Mar. 14, 2011, 2 pg.
Examination Report No. 1 for co-pending Australian Patent App. No. 2013359293 dated Oct. 16, 2014.
Response to Examination Report No. 1 for co-pending Australian Patent App. No. 2013359293 dated Apr. 1, 2015.
Examination Report No. 2 for co-pending Australian Patent App. No. 2013359293 dated Apr. 7, 2015.
Response to Examination Report No. 2 for co-pending Australian Patent App. No. 2013359293 dated Dec. 7, 2015.
International Search Report of PCT/AU2012/001490, mailed Jun. 13, 2013.
Written Opinion of PCT/AU2012/001490, mailed Jun. 8, 2014.
International Preliminary Report on Patentability of PCT/AU2012/001490, mailed Jun. 8, 2014.
European Supplementary Search Report in copending EP Application No. 12856203 dated Jan. 12, 2016.
European Search Opinion in copending EP Application No. 12856203 dated Jan. 19, 2016.
Amendments filed After Receipt of European Search Report in copending EP Application No. 12856203 dated Jul. 27, 2016.

* cited by examiner

PUMP APPARATUS

TECHNICAL FIELD

This disclosure relates generally to pump apparatus and more particularly, though not exclusively, to pump apparatus which is suitable for use in strip mining operations including highwall mining.

Strip mining or surface mining is a type of mining in which the overburden or earth overlying the mining deposit is removed to provide access to the deposit. Highwall mining is a type of strip mining. In highwall mining the removal of the overburden leaves a steep wall between the mining or work site where the deposit is being mined and the original earth surface. The management of water at the work or, mining site where excavation and drilling operations take place is a significant issue. Generally any water at the work site is removed by the use of pumps. It is important however that the region of the work site is not unduly cluttered with equipment. This is done by the provision of pumps however it is desirable that the pumps do not interfere with the drilling devices.

SUMMARY OF THE DISCLOSURE

In a first aspect, embodiments are disclosed of a work head suitable for use with a pump apparatus, the pump apparatus comprising a base or chassis, the work head being adapted to be payed out from the base or chassis so that it can be positioned at a work or mining site, the work head comprising a pump having an outlet which is operatively connected to a conveying conduit. The arrangement is such that water at the work or mine site can be pumped through the conveying conduit and discharged at a region away from the work or mine site. Reference to water throughout this specification may include slurries and other liquids being waste liquids or otherwise.

In certain embodiments the work head comprises a support frame to which the pump is mounted. In certain embodiments, the support frame may be in the form of a cage-like structure, the pump being mounted within the cage structure. In certain embodiments the cage structure is generally spherical in shape, the pump being mounted within the spherical shaped cage structure. In certain embodiments the cage-like structure comprises a skeletal-like configuration or structural members. The arrangement is such that the cage-like structure provides a protective assembly for the pump when in use.

In certain embodiments the work head comprises a traction drive assembly which is operatively mounted to the support frame. In certain embodiments the traction drive assembly includes two or more traction drive units each of which is separately powered. In certain embodiments each traction drive unit comprises at least one drive wheel having a drive motor associated therewith. In certain embodiments each drive. motor may be in the form of a hydraulic motor. In certain embodiments the drive motor and associated drive which are operatively mounted to the support frame.

In certain embodiments the support frame comprises a front section, a rear section and opposed side sections arranged so as to provide an interior space said pump being disposed within said interior space, at least one of the front or rear sections being substantially closed by a wall. In certain embodiments both the front and rear sections are substantially closed by a wall the side sections being substantially open.

In a second aspect, embodiments are disclosed of a reel assembly for use with a pump apparatus, the pump apparatus comprising a base or chassis, the reel assembly being mountable to the base or chassis when in use and including a rotatable reel, a conveying conduit and a flexible service line each which can be supported by the reel and can be payed out from or wound onto the reel. In certain embodiments the service line may comprise a plurality of hoses and/or cables. In certain embodiments the service line may comprise a plurality of hydraulic hoses for hydraulic fluid. In certain embodiments the hoses and/or cables may be tied together. In certain embodiments the hoses and/or cables may be disposed within a flexible sleeve. In certain embodiments the conveying conduit and service line are arranged side-by-side for paying out from or winding onto the reel.

In certain embodiments the reel may comprise opposed spaced apart sides and drive sections therebetween, the conveying conduit and flexible line being adapted to be wound onto or payed out from the drum section. In certain embodiments each side may comprise a bearing on which the reel can rotate. In certain embodiments each side may include a plurality of spoke-like members extending from the bearing and terminating at a peripheral rim. In certain embodiments the assembly may include a discharge pipe operatively mounted to the reel and operatively connected to the conveying conduit.

In certain embodiments the flexible service line comprises a further conduit the conveying conduit and the further conduit being a unitary body. In certain embodiments the conveying conduit and the further conduit have a common side wall portion and configured as a "figure 8" when viewed in cross-section. In certain embodiments the conveying and further conduits are arranged side by side when on the reel.

In a third aspect, embodiments are disclosed of a guide device suitable for use in a pump apparatus, the pump apparatus comprising a base or chassis and a reel assembly from which flexible lines can be payed out, the guide device comprising spaced apart side wall members connected together to form a rigid frame structure, the frame structure having opposed open ends through which the flexible lines can pass, the side wall members flaring outwardly in the region of the openings.

In certain embodiments the guide device includes two sets of rollers configured so as to provide a travel path therebetween for the flexible lines between the open ends, one set of rollers being adapted to be driven. In certain embodiments each roller of the set of driven rollers is driven by a hydraulic motor. In certain embodiments the two sets of rollers are configured so that the travel path is generally curved.

In a fourth aspect, embodiments are disclosed of a pump apparatus comprising a base or chassis, a power unit and a reel assembly each operatively mounted to the base or chassis, a flexible conveyor conduit and flexible service line adapted to be payed out from the reel assembly and a work head including a pump operatively connected to the conveyor conduit.

In certain embodiments the work head is as described earlier. In certain embodiments the reel assembly is as described earlier.

In certain embodiments the pump apparatus further includes a guide device, the guide device being as described earlier. In certain embodiments the apparatus includes a boom assembly, the guide device being operatively mounted to a free end of the boom assembly.

Other aspects, features, and advantages will become apparent from the following detailed description when taken in conjunction with the accompanying drawings, which are a part of this disclosure and which illustrate, by way of example, principles of inventions disclosed.

DESCRIPTION OF THE FIGURES

The accompanying drawings facilitate an understanding of the various embodiments.

DETAILED DESCRIPTION

Figure 1:
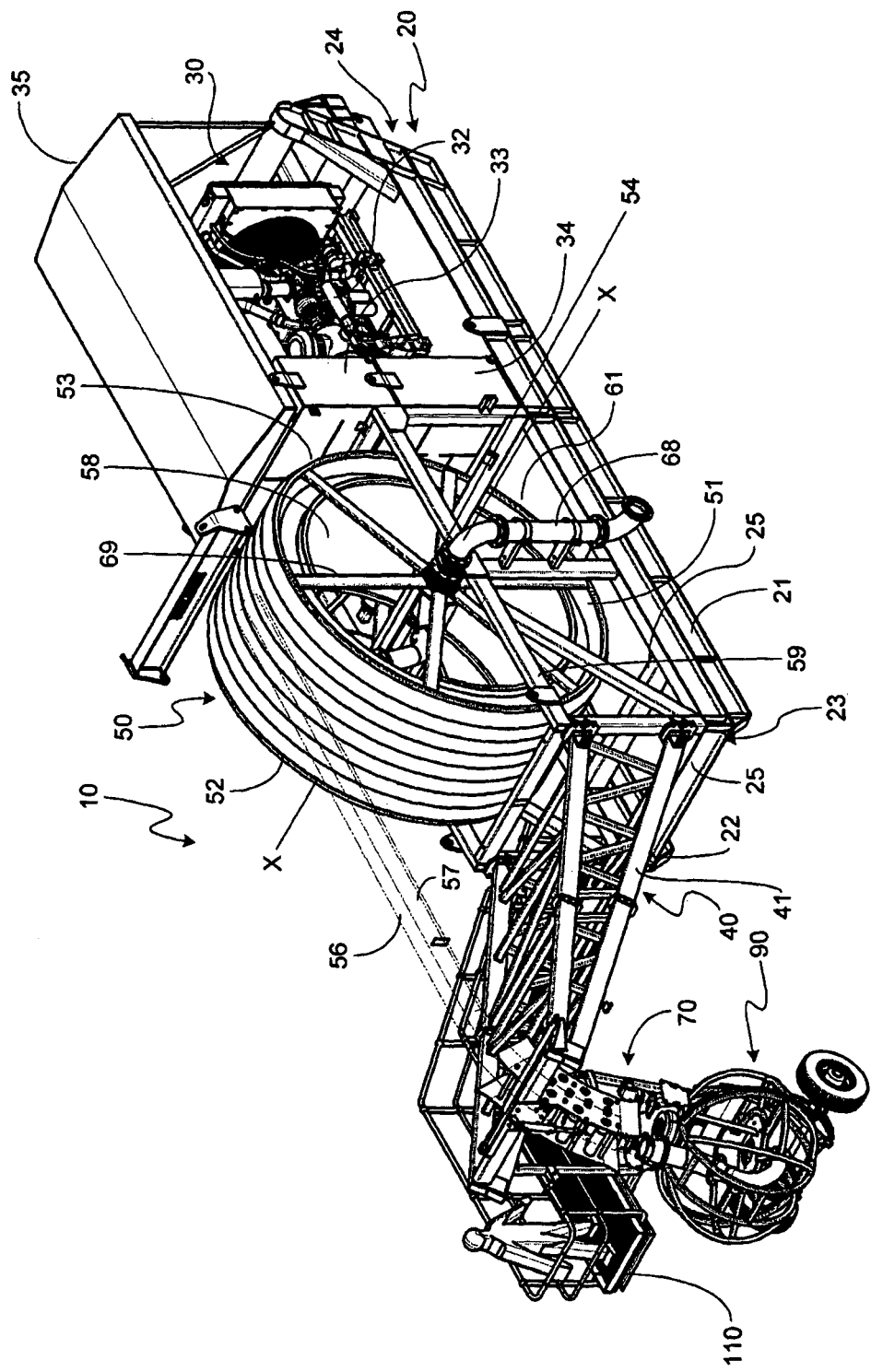
FIG. 1 is a schematic isometric view of a pump apparatus according to one embodiment view from one side.

Referring to the drawings, there is illustrated a pump apparatus generally indicated at item 10 which finds particular application in high-wall mining operations.

The pump apparatus 10 comprises a base or chassis 20 which comprises two longitudinally extending, generally parallel spaced apart beams 21, 22 which are interconnected by a series of cross-members 25 (only two can be seen in FIG. 1), so as to form a rigid structure. The base or chassis 20 can form a skid which can be pulled over the ground on which it stands. In one arrangement the base 20 may be fitted propelled by two endless belts or tracks that pass over a number of wheels, or other traction drive systems to facilitate movement over the ground. The base or chassis 20 is generally elongate and has a forward end 23 and a rearward end 24 (in terms of its in-use orientation, as will shortly be explained). The base 20 can also be fitted with push bars and alloy wear plates in various ground-engaging locations to facilitate movement over hard rock material without damage being caused.

The pump apparatus 10 further comprises a power unit 30 which includes a diesel motor 32 which is adapted to drive a hydraulic pump (not shown). The diesel motor 32 and hydraulic pump (not shown) are mounted to the base or chassis 20 in a region towards the rearward end 24 thereof. Reservoirs 33 and 34 are arranged adjacent the diesel motor 32 and hydraulic pump for providing storage for fuel for the diesel motor 32 and hydraulic fluid storage for the hydraulic pump and any associated hydraulic devices, as will be hereinafter described. The diesel motor 32 is arranged to drive the hydraulic pump which in turn draws hydraulic fluid from the reservoir which in turn provides hydraulic pressure for the operation of the associated hydraulic devices. A canopy 35 provides a cover for the motor 32 and pump.

Figure 3:
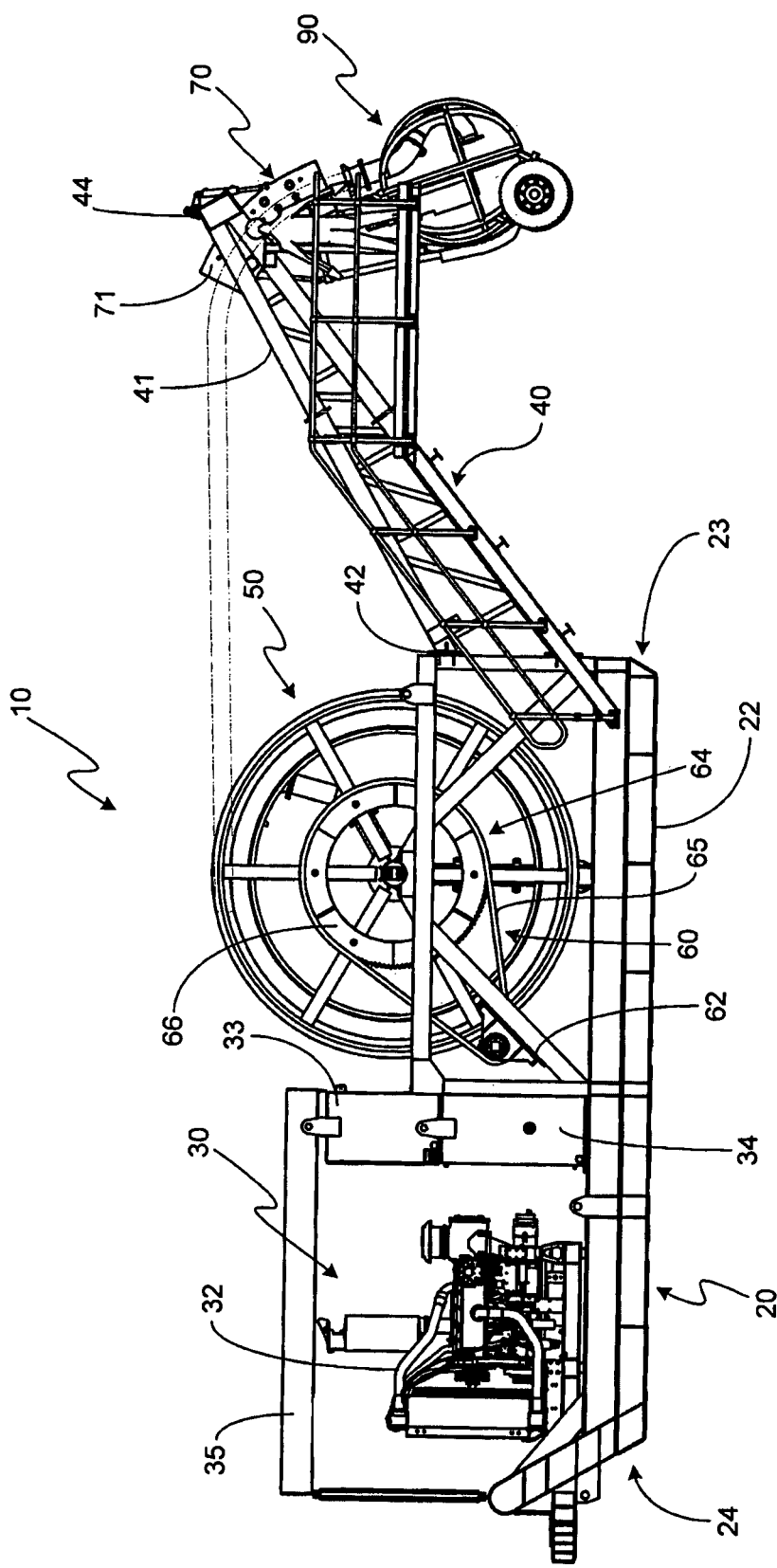
FIG. 3 is a first side elevation of the pump apparatus illustrated in FIGS. 1 and 2.
Figure 4:
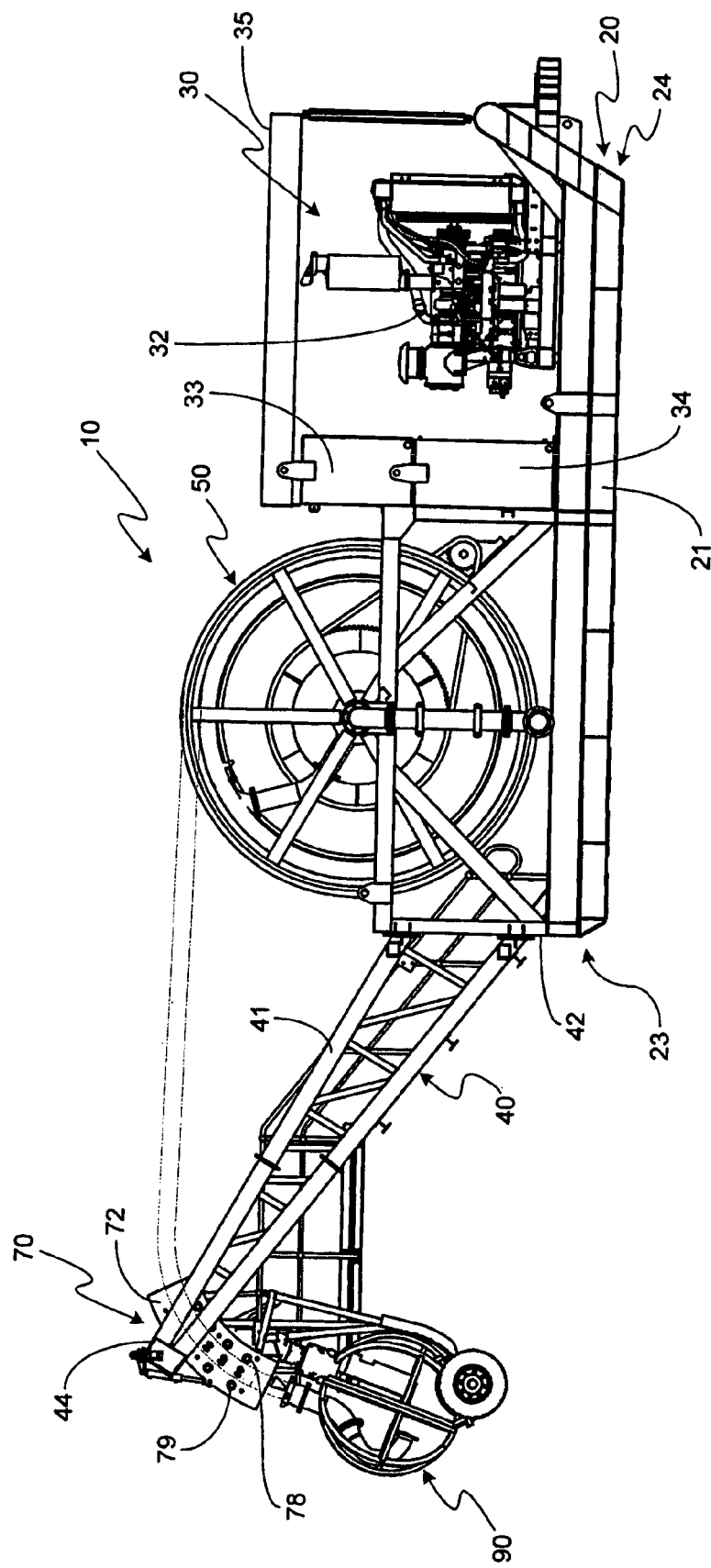
FIG. 4 is a second side elevation of the pump apparatus illustrated in FIGS. 1 and 2 viewed from the one side.
Figure 5:
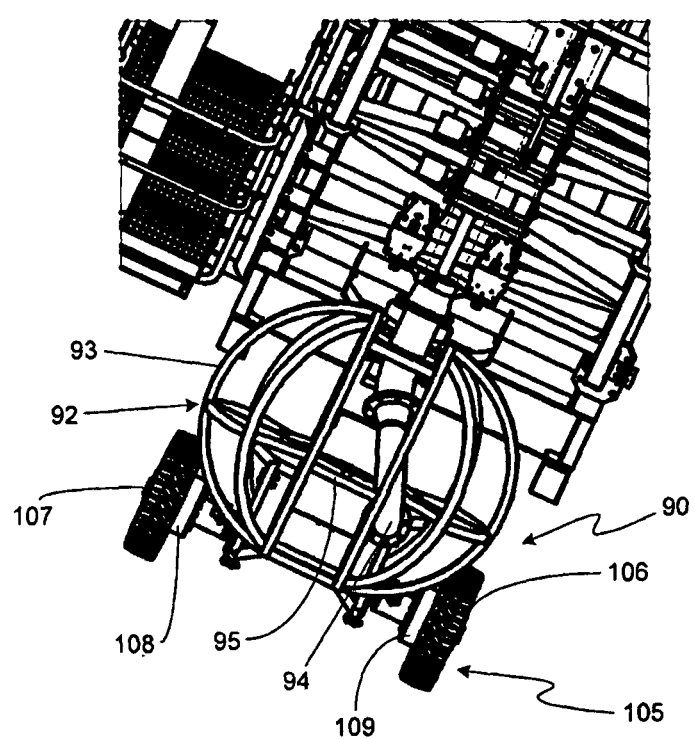
FIG. 5 is a detailed view of part of the apparatus illustrated in FIGS. 1 to 4.
Figure 6:
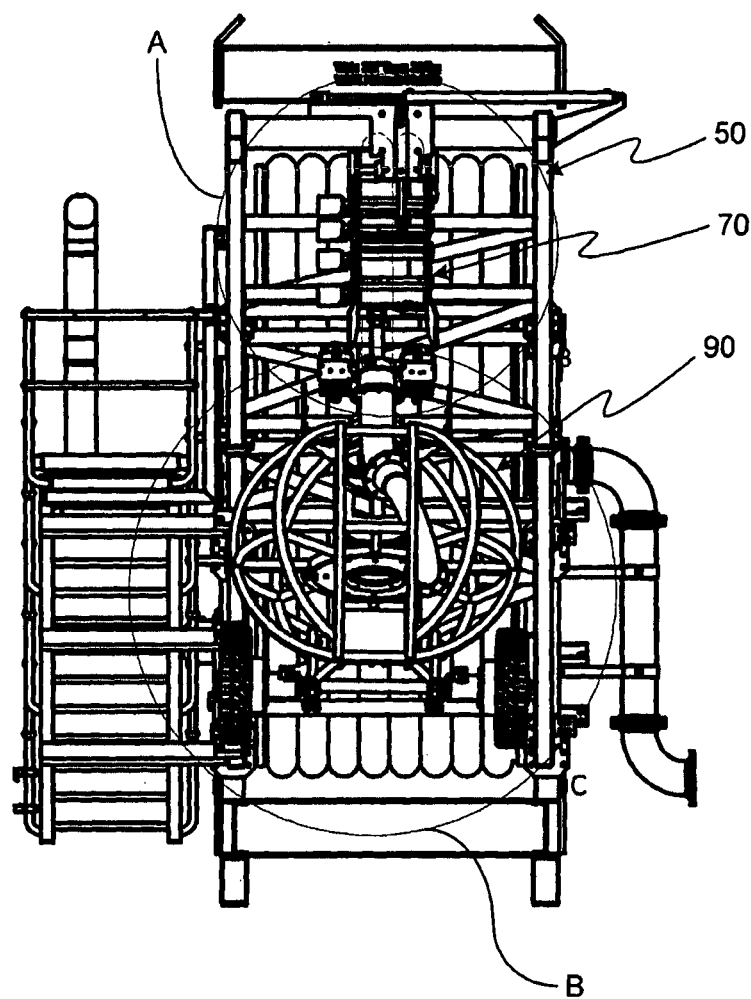
FIG. 6 is a detailed view of part of the apparatus illustrated in FIGS. 1 to 5.

A boom assembly 40 is mounted to the base or chassis 20 at the forward end 23 thereof. The boom assembly 40 may be formed from a number of sections which when assembled form a rigid structure but which can be disassembled for storage or transport of the apparatus. The boom assembly is an elongated frame structure 41 with one end 42 mounted to the base or chassis 20 at the forward end 23 thereof and a free end 44 (FIGS. 3 and 4). As shown, the frame structure 41 extends outwardly from the forward end 23 of the base or chassis 20 in an upwardly inclined orientation.

The apparatus 10 further comprises a reel assembly 50 which is operatively mounted to the base or chassis 20 for rotation about a rotation axis X-X (FIG. 1). The reel assembly 50 comprises a reel 51 comprising sides 52, 53 and a drum section 58. The reel 51 further includes bearings 54, 55 operatively mounted to frame 59. The sides 52 and 53 comprise a plurality of spoke-like members 69 which extend from the bearings 54, 55 which terminate at a peripheral rim 61. In the embodiment shown, there are two flexible lines 56, 57 which can be wound on, or payed out, from the drum section 58 of the reel 51. The line 56 is a conveying conduit for facilitating the passage of water or slurry therethrough. The line 57 is a sleeve which contains a number of service lines in the form of hydraulic hoses for the transfer of hydraulic fluid from the hydraulic pump (mentioned above) to the various associated hydraulic devices. The conduits or sleeves can be manufactured of any suitable material such as rubber, polyurethane or the like. The drive 60 is adapted to rotate the reel 51. The drive 60 includes a hydraulic motor 62 and a transmission which includes a gear box and a sprocket and chain mechanism 64 which includes a chain 65 and sprocket wheel 66 (FIG. 3). A discharge pipe 68 is in fluid communication with the conveying conduit line 56.

Figure 2:
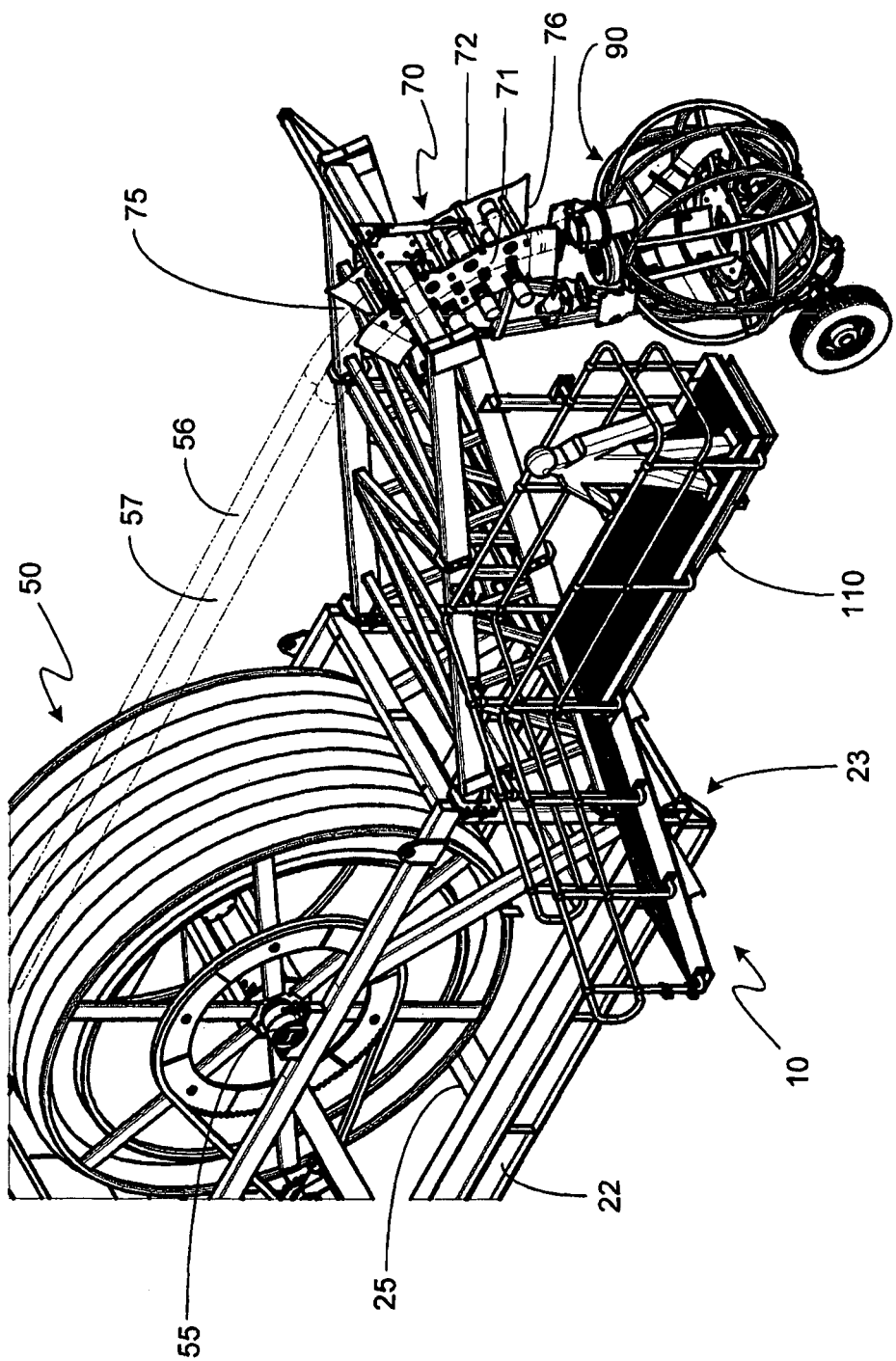
FIG. 2 is a partial schematic isometric view of the pump apparatus illustrated in FIG. 1 viewed from the other side opposite to the one side.

At the free end 44 of the boom assembly 40 there is operatively mounted a guide device 70 through which the flexible lines pass as they are wound on or payed out from the reel 51. The guide device 70 comprises opposed side wall members 71, 72 which are spaced apart and which are connected together to form a rigid frame structure in the form of a channel or a cradle. The frame structure has open ends 75, 76 through which the flexible lines can pass. The guide device 70 further includes two sets of rollers 78, 79 which provide a travel path for the flexible lines between the sets of rollers 78, 79. The rollers in each group are configured so that the path therebetween is generally curved between the open ends. The flexible lines 56, 57 therefore change direction as they follow the path through the guide device. One set of rollers 78 are arranged to be rotatably driven by hydraulic motors 80 there being a motor 80 associated with each roller 78 forming the set. The other set of rollers 79 are freely rotatable idle rollers. The hydraulic motors 80 are synchronised with the hydraulic motor 62 so that they operate correctly together. As is best illustrated in FIG. 2, the side wall members 71 and 72 flare outwardly at the open ends 75 and 76 to prevent the flexible lines 56, 57 from getting caught or jammed as they move through the guide device 70 in use.

Figure 8:
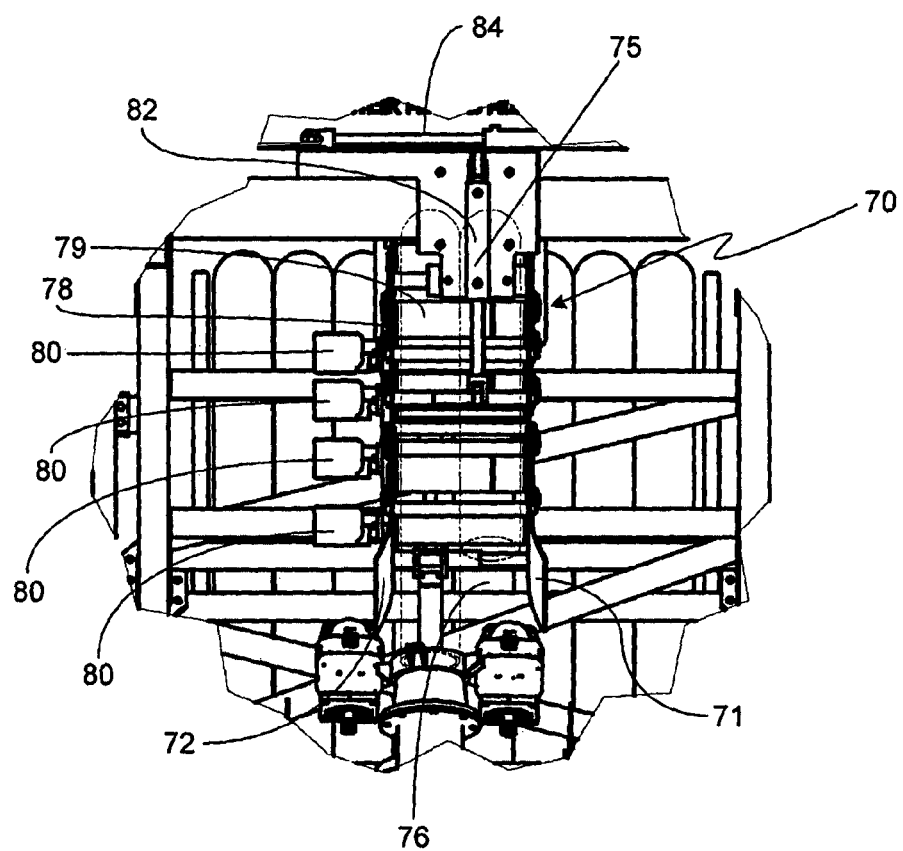
FIG. 8 is a detailed view of the part shown in circle A in FIG. 6.

The guide device 70 is pivotably mounted to the boom assembly 40 so that its orientation relative thereto can be changed. The pivotal movement is effected by a hydraulic piston/cylinder 82. In addition the guide device 70 can be laterally displaced relative to the boom assembly 80. This is effected by a further hydraulic piston/cylinder 84. This is best illustrated in FIG. 8.

Figure 7:
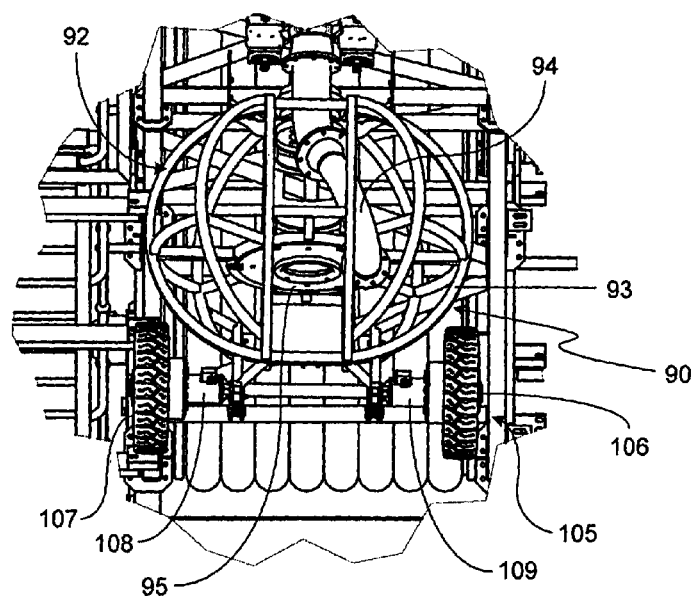
FIG. 7 is a detailed view of the part shown in circle B in FIG. 6.
Figure 9:
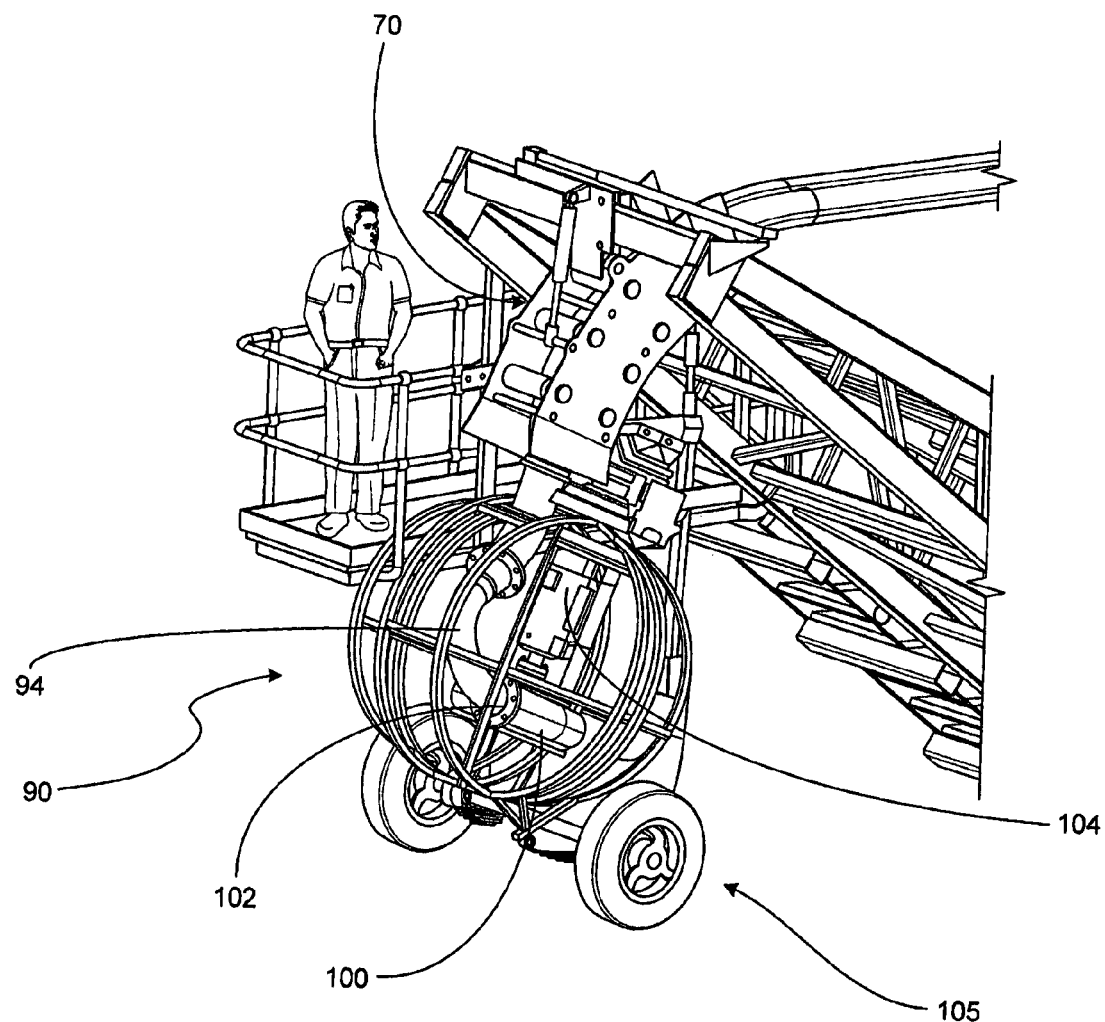
FIG. 9 is a schematic illustration of a part of the apparatus illustrated in FIGS. 1 to 8.

The apparatus 10 further comprises a work head 90 which comprises a support frame 92 which is a cage-like structure 93 which in the embodiment shown in FIGS. 1 to 9 is of a generally spherical configuration. The support frame 92 is adapted to have a pump mounted thereto on a bracket 95 which forms part of the support frame 92 (FIG. 7). The pump 100 is not shown in FIGS. 1 to 8 but is illustrated in FIG. 9 and in the embodiment shown in FIGS. 10-12. The pump 100 is a submersible centrifugal pump. The pump 100 has an outlet 102 which is operatively coupled to the line 56 via the pipe 94. The pump 100 is driven by a hydraulic motor (not shown) which is mounted to the support frame 92 through a gear box 104. The submersible pump can be of the close-coupled type, solidly mounted to a hydraulic drive motor in a compact arrangement which eliminates external couplings and issues about line-up of components. The wetted parts can be made of wear and/or corrosion resistant materials.

The work head 90 further includes a traction drive assembly 105 which comprises separately driven traction wheels 106, 107. Each wheel 106, 107 is individually driven by a respective hydraulic motor 108, 109; that is, there is a separate hydraulic motor associated with each of the drive wheels to assist with launching and retrieval. The hydraulic motors are each mounted to a respective wheel or to the support frame (FIG. 7). The hydraulic drive system controls proportional directional valves to in turn control hose reel direction and speed, roller head orientation, and independent rotation direction control for each drive wheel of the work head 90. The hose reel itself is powered by a hydraulic motor-driven gearbox fitted with motion control valves and a park brake for safety. The provision of driven traction wheels significantly improves the maneuverability of the work head driving operation.

The apparatus further includes a platform 110 which is accessed by personnel to gain easy access to the work head 90 and guide device 70. The apparatus 10 comprises a series of individual modules which can be separated from one another for the purpose of storage and transport. The modules may be configured so that all of the modules can fit into a standard 40-foot shipping container. When assembled, the centre of gravity of the apparatus is towards the rearward end. A control panel is provided together with a visual display in the rearward end. A camera is provided on the end region of the boom.

Another embodiment of the apparatus 10 is depicted in FIGS. 10 to 13. Where possible, the same reference numerals have been used to describe the same components which were described in the earlier embodiment(s).

Figure 10:
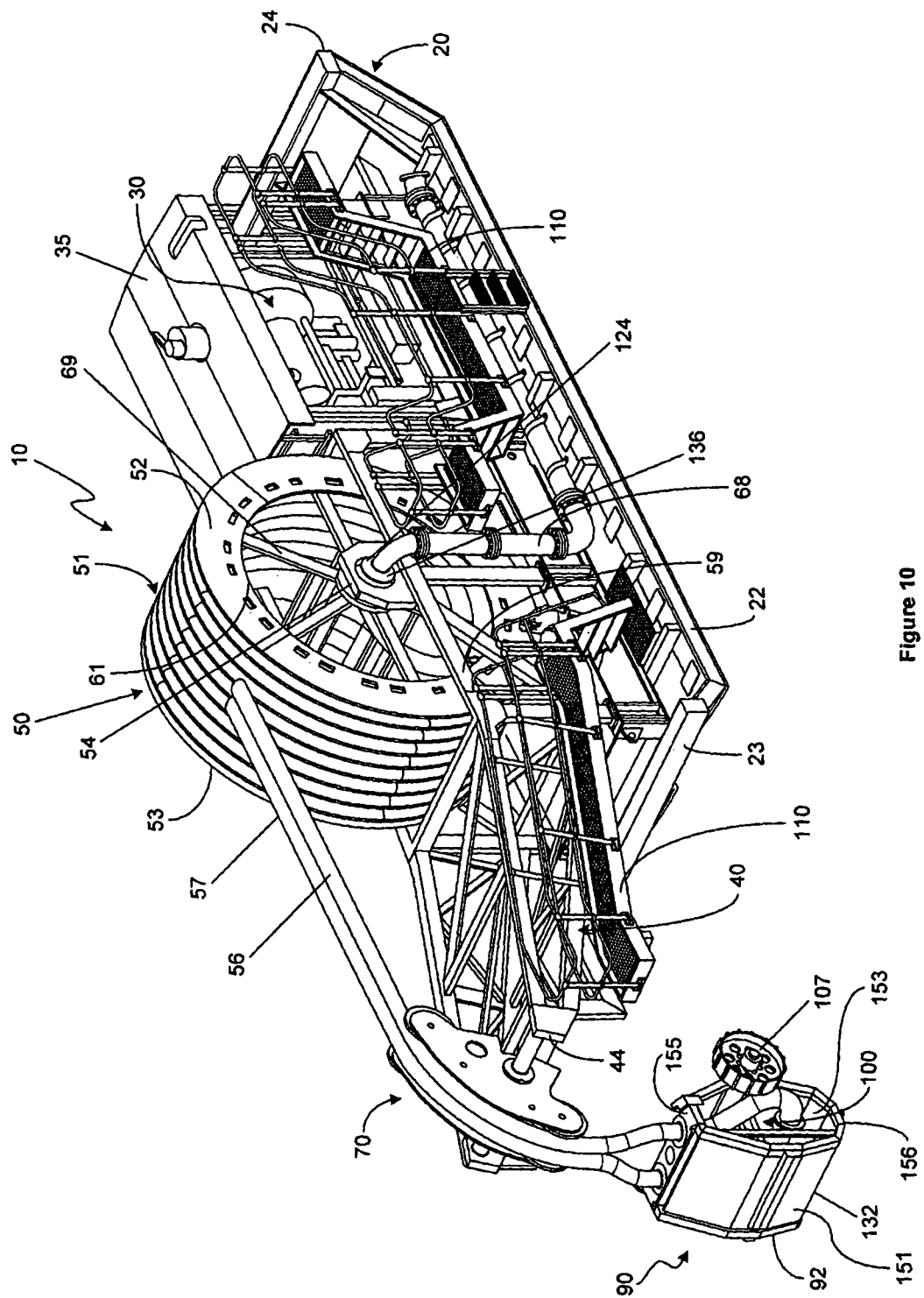
FIG. 10 is a schematic isometric view of a pump apparatus according to another embodiment, when viewed from one side and from one end.
Figure 11:
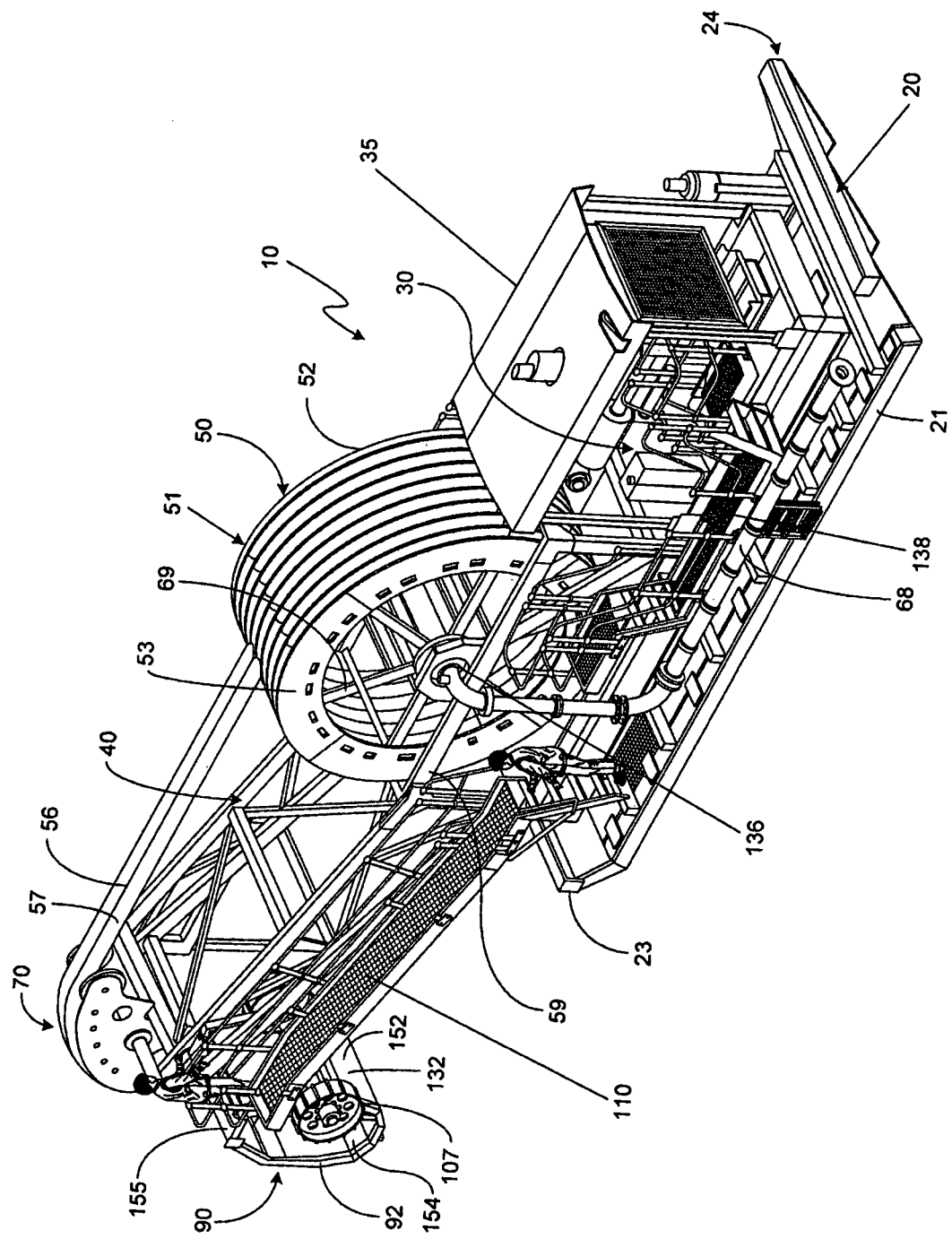
FIG. 11 is a schematic isometric view of the pump apparatus illustrated in FIG. 10 viewed from the one side, and from the other end to the one end.
Figure 12:
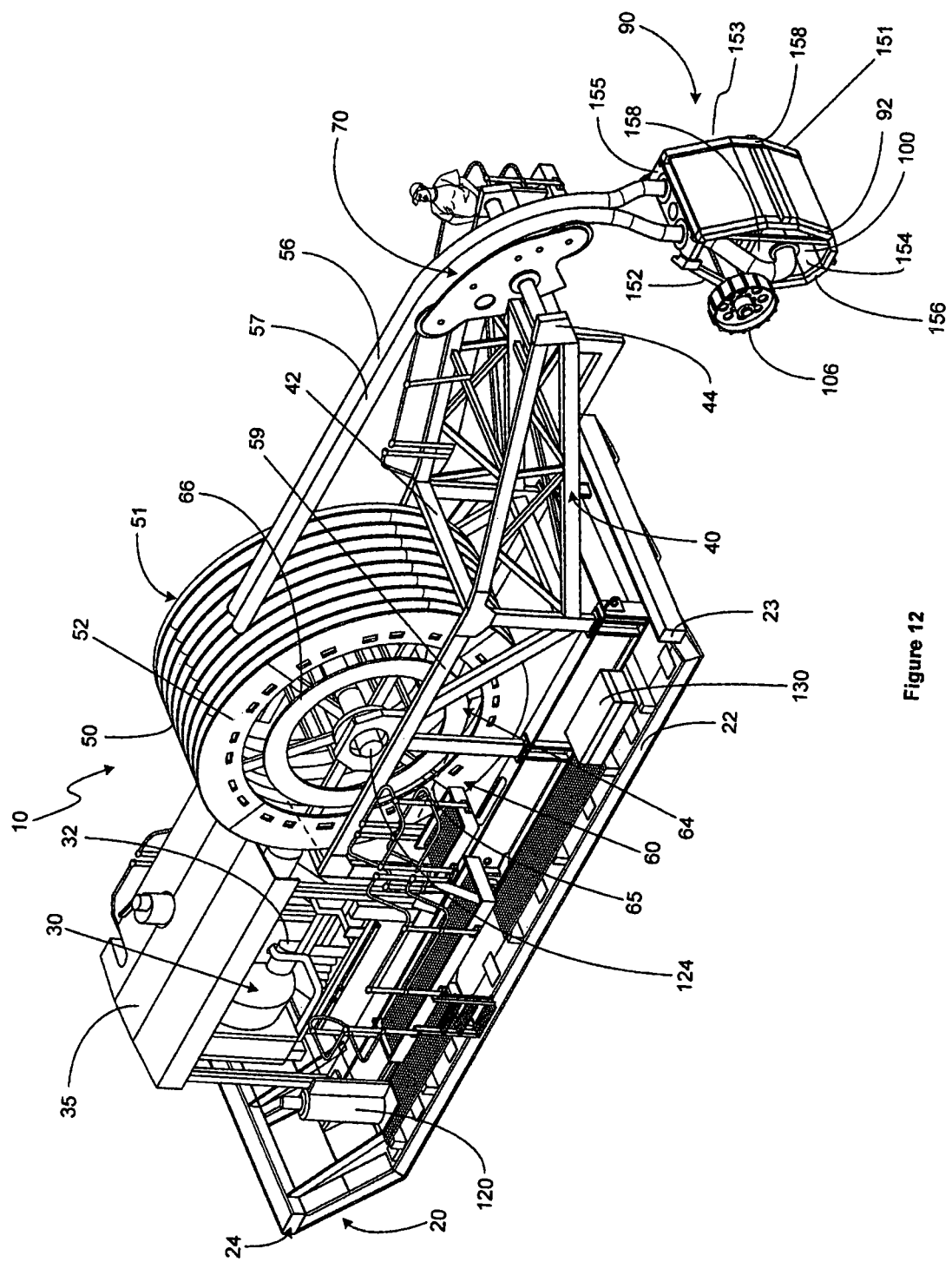
FIG. 12 is a further schematic isometric view of the apparatus illustrated in FIGS. 10 and 11.

In the embodiment of FIGS. 10 to 12 and as clearly shown in FIG. 12 the work head 90 comprises a support frame 92 which includes a front section 151, a rear section 152, opposed side sections 153, 154, a top section 155 and a bottom section 156. The front section 151 faces away or outwards from the pump base or chassis 20 and the rear section faces towards the pump base or chassis 20. One or both of the front 151 or rear 152 sections are substantially closed or covered by plate members 132 which provide protection for the pump 100 and other equipment covered by the work head 90. The side sections 153, 154 are substantially open thereby providing access to the pump 100 therethrough. The top and bottom sections may also be covered or closed by plate members. The flexible lines 56, 57 are operatively mounted to the top section 155. The sections of support frame 92 form a boundary around, an interior space 158, within which pump 100 is mounted. The plate members 132 provide protection for the pump 100 in regions where the pump is susceptible to damage when in operation. The wheels 106, 107, are formed from steel and include grouser plates.

The reel 50 is provided with rotary unions or joints for the water 136 and hydraulic lines 122. A hydraulic manifold 124 for the various hydraulic service lines is also provided. The apparatus also includes additional access platforms 110 as well as a fire suppression system 120 and conveniently located tool box 130.

Figure 13:
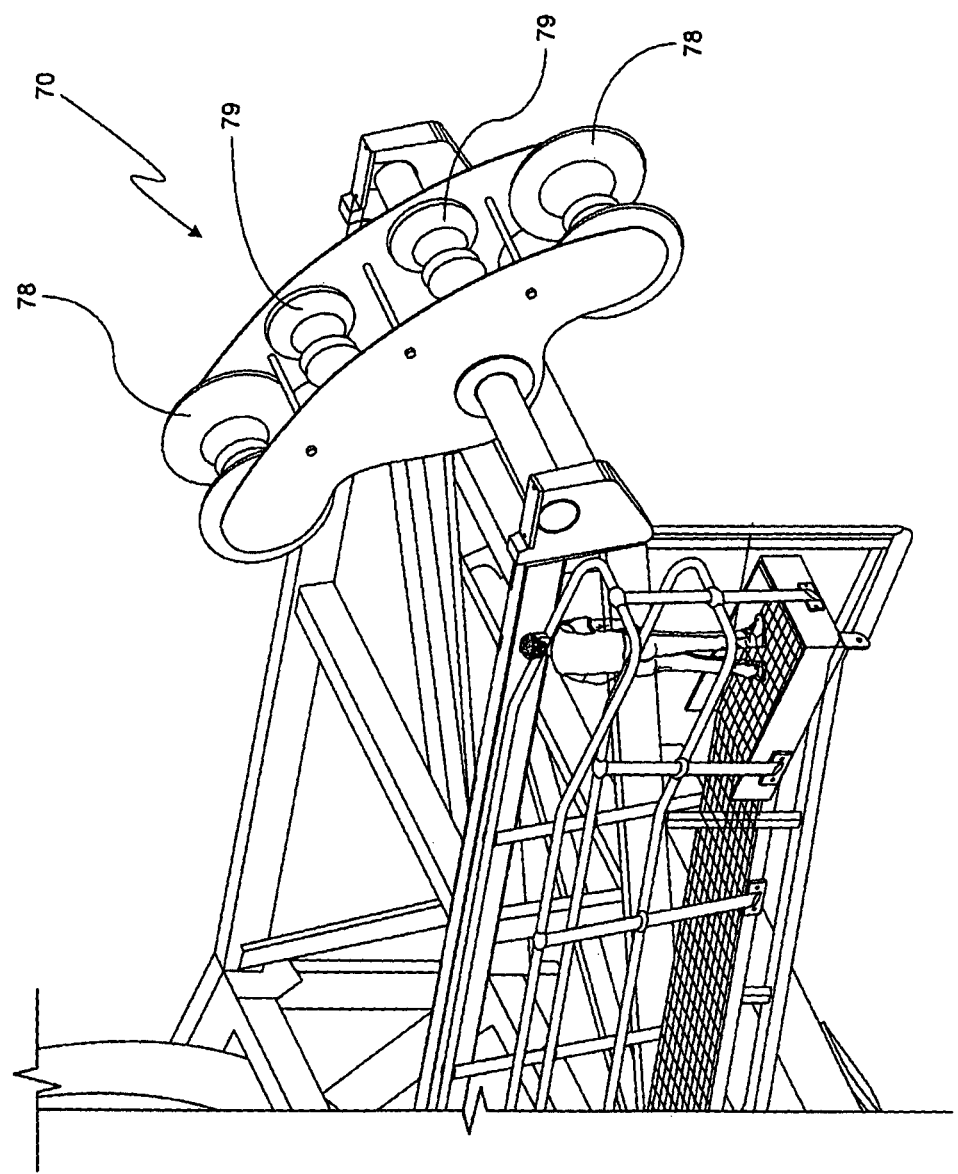
FIG. 13 is a schematic isometric view of a component of the apparatus illustrated in FIGS. 10 to 12.

FIG. 13 shows the guide device 70 including a set of four rollers 78, 79 which can be either idle rollers or powered rollers or any combination thereof depending on the circumstance of use. The device is self centralising and provides for an indexing mechanism.

Figure 15:
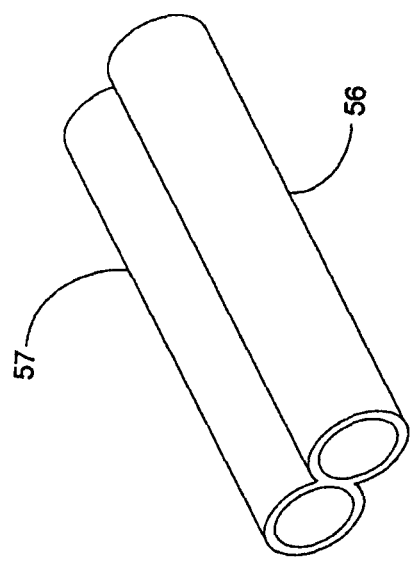
FIG. 15 is an isometric view of the conduit illustrated in FIG. 14.
Figure 14:
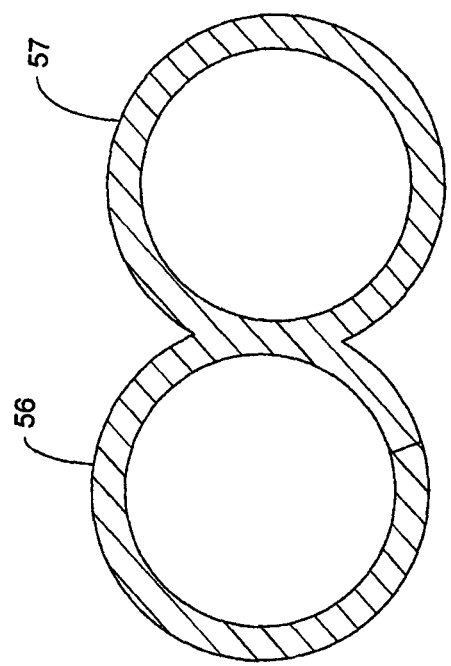
FIG. 14 is an end view of a conduit illustrated in FIGS. 10 to 13.

The flexible lines 56, 57 are depicted in FIGS. 14 and 15. The lines 56, 57 are formed as a unitary body, with a common side wall providing a cross-sectional configuration in the form of a "figure of 8". As described above, the line 56 is a conduit for conveying water or slurry from the pump 100, and the line 57 is a conduit which contains a number of service lines for transfer of hydraulic fluid to the various associated hydraulic devices. There are 7 service lines within conduit line 57, comprising 2 hoses to drive the hydraulic pump (into the pump and out of the pump), 1 hose as a case drain (from pump to the base unit) and 4 hoses to steer the traction wheels 106, 107. The separation of the conduit 56 into one channel and a further conduit which contains the service lines greatly improves the conveyance of water through conduit 56.

Protection of the various hydraulic components is provided through continuous filtration of hydraulic fluids, via the charge circuit, main hydraulic motor case, wet-end bearing flushing and auxiliary system return oil, to a level of 10 micrometers of particulate material. The system fluid temperature is maintained at an optimum range by an onboard oil cooler which is automatically controlled by a thermal bypass valve.

The operation of the pump apparatus with reference to its particular application in highwall mining operations will hereinafter be described. The base or chassis is positioned on top of the earth surface adjacent the steep wall face down to the work site with the boom extending beyond the steep wall. The operator controls the operation from the rearward end region of the apparatus for improved safety. In addition, the centre of gravity of the assembly is towards the rearward end region to provide for better stability of the apparatus.

The operator then actuates the reel motor and the work head is payed out therefrom descending towards the work or mine site. The guide device assists in controlling the work head as it is payed out from the reel. The flared ends of the guide device limit the possibility of damage to the conduits or sleeves as they pass through the guide device. The traction drive wheels can be individually activated to avoid obstructions and enable the work head to be maneuvered.

When the work head is at the work site it can be activated so that water can be drawn from the work site along the conduit and discharged through the discharge pipe at the reel. Because the hydraulic lines are separate from the conduit the flow of water is substantially uninhibited.

The typical submersible pump used is designed to achieve maximum flow rates of up to 200 liters per second at 100 m head. A further booster pump option is attachable for enhancing head capability up to an additional 100 m head. An emergency hydraulic retrieval system is in place for the work head 90 in the event of it becoming stuck or jammed on a mine wall face. The control of the operation of the work head 90 and of the reel assembly 50 is by way of a pilot-operated joystick control of the hydraulics at the apparatus 10, for easy and reliable operation. As a further optional extra, a video camera can be provided on the work head 90 to provide visibility of the wet end module during operation.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner, to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

| Table of Parts | |
|---|---|
| Pump Apparatus | 10 |
| Base/Chassis (Skid) | 20 |
| Beams | 21/22 |
| Cross Members | 25 |
| Forward End | 23 |
| Rearward End | 24 |
| Power Unit | 30 |
| Diesel Motor | 32 |
| Reservoirs | 33/34 |
| Canopy | 35 |
| Boom Assembly | 40 |
| Elongated Frame Structure | 41 |
| End (Mounted to Base) | 42 |
| Free End | 44 |
| Reel Assembly | 50 |
| Rotation Axis | X-X |
| Reel | 51 |
| Sides | 52/53 |
| Drum Section | 58 |
| Bearnes | 54/55 |
| Frame | 59 |
| Spoke Like Members | 69 |
| Peripheral Rim | 61 |
| Flexible Lines | 56/57 |
| Drive | 60 |
| Hydraulic Motor | 62 |
| Transmission (Gear Box, Sprocket and Chain) | 64 |
| Chain | 65 |
| Sprocket Wheel | 66 |
| Discharge Pipe | 68 |
| Guide Device | 70 |
| Piston/Cylinder (Guide Pivot) | 82 |
| Piston/Cylinder (Lateral Movement) | 84 |
| Opposed Side Wall Members | 71/72 |
| Open Ends | 75/76 |
| Two Sets of Rollers | 78/79 |
| Rollers (78) Driven by Hydraulic Motors | 82 |
| Rollers (70) Idler Outwardly Flared | |
| Work Head | 90 |
| Support Frame | 92 |
| Cage Like Structure | 93 |
| Pump | 100 |
| Bracket (Pump Mount) | 95 |
| Pump Outlet | 102 |
| Connector Pipe | 94 |
| Gear Box | 104 |
| Traction Drive Assembly | 105 |
| Drive Traction Wheels | 106/107 |
| Hydraulic Motors | 108/109 |
| Platform | 110 |
| Fire Suppression System | 120 |
| Rotary Union Hydraulic | 122 |
| Manifold Hydraulic | 124 |
| Tool Box | 130 |
| Plate Member | 132 |
| Access Platform | 134 |
| Rotary Union Water | 136 |
| Access Platform | 138 |
| Cross-section | 140 |
| Front Section | 151 |
| Rear Section | 152 |
| Side Sections | 153/154 |
| Top Section | 155 |
| Bottom Section | 156 |
| Interior Space | 158 |

The invention claimed is:

1. A pump apparatus comprising a base or chassis, a power unit and a reel assembly each operatively mounted to the base or chassis, a flexible conveyor conduit and a flexible service line adapted to be payed out from the reel assembly and a work head, the work head suitable for use in the pump apparatus and being adapted to be payed out from the base or chassis for location at a work site, the work head comprising a submersible pump having an outlet which is operatively connected to the flexible conveyor conduit, a support frame, said pump being mounted within the support frame, and a powered traction drive assembly mounted to the support frame and configured to enable the work head to be maneuvered over a surface when in use, wherein the work head is operatively connected to the flexible conveyor conduit the traction drive assembly including two drive wheels each independently powered.

2. A pump apparatus according to claim 1, including a further flexible conveyor conduit adapted to be payed out from the reel assembly, and wherein the flexible conveyor conduits being a unitary body adapted to be wound on and payed out from the reel.

3. A pump apparatus according to claim 1, including one or more flexible lines adapted to be payed out from the reel assembly, and further comprising a guide device that includes spaced apart side wall members connected together to form a rigid frame structure, the frame structure having opposed open ends through which the flexible lines can pass, the side wall members flaring outwardly in the region of the openings.

4. The pump apparatus according to claim 3, further including a boom assembly, and wherein the guide device being operatively mounted to a free end of the boom assembly.

5. The pump apparatus according to claim 1, wherein each drive wheel has associated therewith a respective drive motor.

6. The pump apparatus according to claim 5, wherein said drive motors are hydraulic mounted to the support frame.

7. The pump apparatus according to claim 1, wherein the support frame is in the form of a cage structure for the pump being mounted within the cage structure.

8. The pump apparatus according to claim 7, wherein the cage structure is generally spherical in shape, the pump being mounted within the spherical shaped cage structure.

9. The pump apparatus according to claim 1, wherein said support frame comprises a front section, a rear section and opposed side sections arranged so as to provide an interior space, and wherein the pump being disposed within said interior space, at least one of the front or rear sections being substantially closed by a wall.

10. The pump apparatus according to claim 9, wherein both the front and rear sections of the support frame are substantially closed by the wall, the opposed side sections being substantially open.

11. The pump apparatus according to claim 1, further including a further flexible conveyor conduit, the flexible conveyor conduits being a unitary body adapted to be wound on and payed out from the reel, wherein the flexible service line comprises a plurality of hydraulic hoses disposed within the further flexible conveyor conduit.

12. The pump apparatus according to claim 11, wherein the flexible conveyor conduit and the further flexible conveyor conduit have a common side wall portion and are configured as a FIG. 8 when viewed in cross-section, and wherein the flexible conveyor conduit and further flexible conveyor conduit are arranged side-by-side when on the reel.

13. A pump apparatus comprising a base or chassis, a power unit and a reel assembly each operatively mounted to the base or chassis, a flexible conveyor conduit and a flexible service line adapted to be payed out from the reel assembly and a work head, the work head suitable for use in the pump apparatus and being adapted to be payed out from the base or chassis for location at a work site, the work head comprising a submersible pump having an outlet which is operatively connected to the flexible conveyor conduit, a support frame, said pump being mounted within the support frame, and a powered traction drive assembly mounted to the support frame and configured to enable the work head to be maneuvered over a surface when in use, wherein the work head is operatively connected to the flexible conveyor conduit, the pump apparatus further including a further flexible conveyor conduit, the flexible conveyor conduits being a unitary body adapted to be wound on and payed out from the reel, wherein the service line comprises a plurality of hydraulic hoses disposed within the further flexible conveyor conduit, the pump apparatus further including a guide device comprising spaced apart side wall members connected together to form a rigid frame structure, the frame structure having opposed open ends through which the flexible conveyor conduits can pass, the side wall members flaring outwardly in the region of the openings, and further including two sets of rollers configured so as to provide a travel path therebetween for the flexible lines between the open ends, one set of rollers being adapted to be driven, wherein each roller of the set of driven rollers is driven by a hydraulic motor, and wherein the two sets of rollers are configured so that the travel path is generally curved.

\* \* \* \* \*